United States Patent
Paaske et al.

(10) Patent No.: US 10,747,295 B1
(45) Date of Patent: Aug. 18, 2020

(54) CONTROL OF A COMPUTER SYSTEM IN A POWER-DOWN STATE

(71) Applicant: Apple Inc., Cupertino, CA (US)

(72) Inventors: Timothy R. Paaske, Cupertino, CA (US); Josh P. de Cesare, Campbell, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 15/721,411

(22) Filed: Sep. 29, 2017

Related U.S. Application Data

(60) Provisional application No. 62/514,750, filed on Jun. 2, 2017.

(51) Int. Cl.
| | | |
|---|---|---|
| *G06F 1/3287* | (2019.01) | |
| *G06F 1/26* | (2006.01) | |
| *G06F 9/4401* | (2018.01) | |
| *G06F 3/06* | (2006.01) | |
| *G06F 11/20* | (2006.01) | |

(52) U.S. Cl.
CPC ............ *G06F 1/3287* (2013.01); *G06F 1/266* (2013.01); *G06F 9/4416* (2013.01); *G06F 3/065* (2013.01); *G06F 3/067* (2013.01); *G06F 3/0625* (2013.01); *G06F 3/0635* (2013.01); *G06F 11/2082* (2013.01)

(58) Field of Classification Search
CPC .. G06F 1/3287; G06F 11/2082; G06F 3/0625; G06F 3/0635; G06F 3/065; G06F 3/067
USPC .......................................................... 713/2
See application file for complete search history.

(56) References Cited

U.S. PATENT DOCUMENTS

| | | | |
|---|---|---|---|
| 6,047,378 A | 4/2000 | Garrett et al. | |
| 7,062,595 B2 | 6/2006 | Lindsay et al. | |
| 8,832,465 B2 | 9/2014 | Gulati et al. | |
| 2003/0130969 A1 | 7/2003 | Hawkins et al. | |
| 2005/0047356 A1 | 3/2005 | Fujii et al. | |
| 2006/0106968 A1 | 5/2006 | Wooi Teoh | |
| 2006/0112287 A1 | 5/2006 | Paljug | |
| 2009/0322597 A1* | 12/2009 | Medina Herrero ... | G01S 5/0027 342/357.48 |

(Continued)

OTHER PUBLICATIONS

Wikipedia, the free encyclopedia, Intelligent Platform Management Interface, https://en.wikipedia.org/wiki/Intelligent_Platform_Management_Interface, retrieved Aug. 24, 2017, 7 pages.

(Continued)

*Primary Examiner* — Terrell S Johnson
(74) *Attorney, Agent, or Firm* — Kowert, Hood, Munyon, Rankin & Goetzel, P.C.

(57) ABSTRACT

Techniques are disclosed relating a computer system in a power-down state receiving a communication from a remote computer system and performing a task indicated by the communication. The computer system in a power-down state performs the task without transitioning from the power-down state into a power-up state. Exemplary tasks performed in the power-down state include uploading one or more files to a remote computer system, downloading one or more files from a remote computer system, deleting one or more files from the computer system, accessing input/output devices, disabling the computer system, and performing a memory check on the computer system.

20 Claims, 10 Drawing Sheets

(56) References Cited

U.S. PATENT DOCUMENTS

| | | | | |
|---|---|---|---|---|
| 2010/0323615 A1* | 12/2010 | Vock | ........................ | H04M 1/60 |
| | | | | 455/26.1 |
| 2011/0106906 A1* | 5/2011 | Assouad | ............... | G06F 3/0625 |
| | | | | 709/212 |
| 2015/0358526 A1* | 12/2015 | Cronin | ................ | H04N 5/23206 |
| | | | | 348/211.3 |
| 2016/0044058 A1* | 2/2016 | Schlauder | ........... | H04L 63/1433 |
| | | | | 726/25 |

OTHER PUBLICATIONS

OS Security—White Paper, iOS 10, Mar. 2017, 68 pages.
Tom Slaight, Intelligent Platform Management Futures: IPMI, CIM, and Emerging Management Technologies, intel, Mar. 5, 2005, 26 pages.
Tom Slaight, Advances in Intelligent Platform Management: IPMI v.2.0 in Action, intel, Sep. 8, 2004, 29 pages.
Intelligent Platform Management Interface Specification Second Generation v2.0, Document Revision 1.1 Oct. 1, 2013, Apr. 21, 2015 E7 Markup, 650 pages.

\* cited by examiner

US 10,747,295 B1

CONTROL OF A COMPUTER SYSTEM IN A POWER-DOWN STATE

This application claims the benefit of U.S. Provisional Application No. 62/514,750, filed on Jun. 2, 2017, which is incorporated by reference herein in its entirety.

BACKGROUND

Technical Field

This disclosure relates generally to the operation of a computer system in a power-down state.

Description of the Related Art

Computer systems or devices may be configured to have various power states. For example, in one power state, all, or substantially all, of the components of a computer system may receive power, while in another power state all, or substantially all of the components may receive no power. A computer system may also have one or more intermediate power states in which only portions of the system receive power.

Computer systems in use today commonly have a network interface that allows either wired or wireless communication with other devices or systems. Such communication may be performed in response to input received from a user physically operating the computer system, as well as to input received remotely. The latter functionality may allow, for example, for a remote user to be able to cause the computer system to play a sound, which may facilitate locating the computer system.

SUMMARY

In an embodiment, a computer system includes a processor circuit and a plurality of input/output device including a network interface and a power control device. The computer system is configured, in response to receiving a user-initiated power-down request via a particular one of the plurality of input/output (I/O) devices, to enter a power down-state in which user communication with the computer system is disabled via the plurality of input/output devices except via the network interface and a power control device until a user-initiated power-up request is subsequently received via the power control device. The computer system is further configured, in the power down state, to maintain power to the processor circuit such that, in response to a communication received via the network interface, the processor circuit is configured to perform a task specified by the communication without exiting the power-down state. Further, the computer system is configured, in response to receiving a power-up request via the power control device, to exit the power-down state and enter a power-up state in which the computer system is responsive to user commands via ones of the I/O devices other than the network interface and the power control device.

In another embodiment, a computer system receives a user-initiated power-down request for the computer system, and in response to the power-down request, the computer system enters a power-down state in which user communication with the computer system is disabled, except via a network interface of the computer system or a power control device of the computer system, until receiving a user-initiated power-up request. While in the power-down state, the computer system receives a communication via the network interface, and in response to the communication, a processing element of the computer system performs a task specified by the communication without exiting the power-down state. In response to subsequently receiving the user-initiated power-up request, the computer system enters a power-up state in which user communication with the computer system is restored via input/output devices of the computer system other than the network interface or power control device.

In still another embodiment, a computer system includes a first processor circuit, a second processor circuit, and a network interface. The computer system is configured, in response to receiving a user-initiated power-down request, to enter a power-down state in which power is removed from a first portion of the computer system that includes the first processor circuit, but in which power is still supplied to a second portion of the computer system that includes the second processor circuit and the network interface. The computer system is further configured, in the power-down state, to perform, by the second processor circuit and without exiting the power-down state, a task specified by a communication received via the network interface. Further, the computer system is configured such that the second processor circuit and the network interface are not able to be turned off via a request initiated by the user.

In various embodiments, the task performed by a computer system in a power-down states relates to one or more of uploading data from the computer system to a remote computer system, downloading data from a remote computer system and storing the data on the computer system, disabling the computer system, deleting one or more files stored in the memory of the computer system, performing a check on the memory of the computer system, or accessing an input/output device of the computer system.

Figure 1:
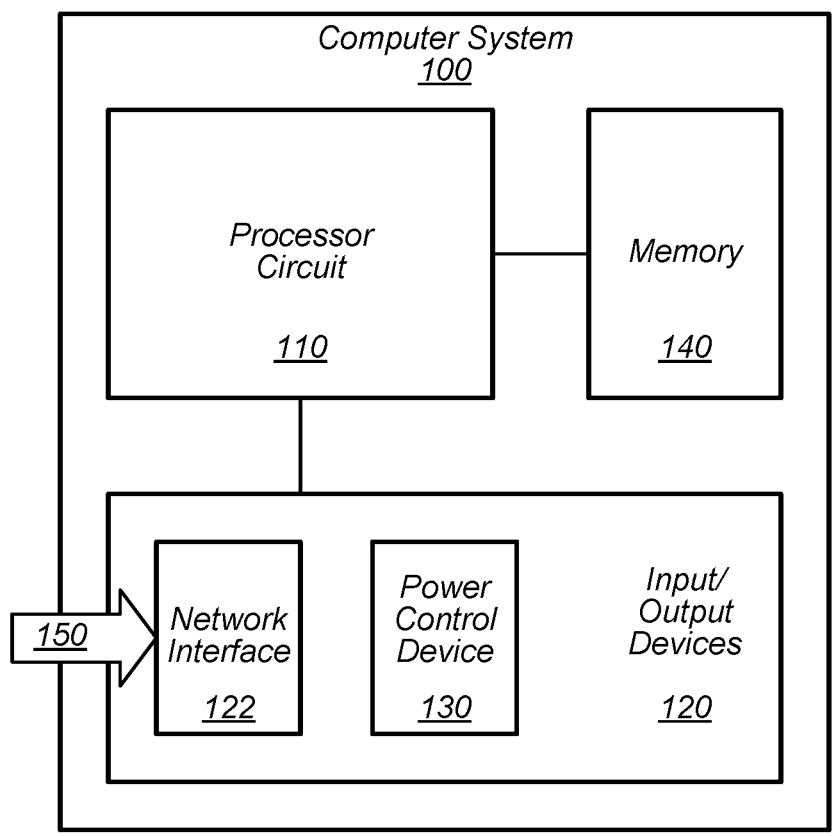
FIG. 1 is a block diagram illustrating a computer system configured to perform one or more tasks in a power-down state in accordance with the disclosed embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured enter a power-down state" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" processor circuit would not imply a temporal ordering between the routines unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

This disclosure describes a computer system configured to perform one or more tasks while the computer system is in an intermediate power state. Broad embodiments of the computer system are described in reference to FIG. 1. Further details relating to the processor circuit and memory of the computer systems are discussed with reference to FIG. 2. Further details relating to the input/output devices of the computer systems in some embodiments are discussed with reference to FIG. 3. Broad embodiments of the operation of the computer system are described in reference to FIG. 4. Further details relating to the operations performed by the computer system in the power-down state are described with reference to FIGS. 5-10.

Referring now to FIG. 1, a block diagram of a computer system 100 is depicted. In the illustrated embodiment, the computer system includes a processor circuit 110, one or more input/output (I/O) devices 120 including a network interface 122 and a power control device 130, and a memory 140. During operation, network interface 122 may receive communication 150. Various components of computer system 100 may be coupled together in various manners, or via a bus interconnection (not shown).

Computer system 100 may be any of a number of computing devices including, but not limited to, a server system, personal computer system, desktop computer, laptop or notebook computer, mainframe computer system, tablet computer, handheld computer, workstation, network computer, embedded computer, a consumer device such as a mobile phone, music player, personal data assistant (PDA), or wearable computer (e.g., a watch, glasses, etc.). Computer system 100 may receive power via an external source (e.g., a power outlet coupled to an electrical grid) (not shown), an integrated source (not shown) such as an energy storage device (e.g., battery, fuel cell, etc.) or energy generation device (e.g., one or more solar cells), or a combination. In some embodiments, computer system 100 includes more than one power supply (e.g., an external source providing power from the grid when plugged in and an integrated battery providing power when the external power source is not providing power).

Processor circuit 110 includes a plurality of components configured to perform various calculations, data processing, logical operations, etc. associated with operating computer system 100. For example, in embodiments where the computer system 100 runs an operating system (e.g., Apple iOS®, Microsoft Windows®), the processor circuit 110 may execute the operating system as well as one or more programs running on top of the operating system (e.g., a web browser, word processor, video player, etc.). During operation, processor circuit 110 may send or receive information from the I/O devices 120 and memory 140. Processor circuit 110 may also receive information from power control device 130 (e.g., a power-down request, a power-up request) during operation. Processor circuit 110 is discussed herein in further detail in reference to FIG. 2. In various embodiments, processor circuit 110 (or various processor circuits within 110) may contain a cache or other form of on-board memory.

The one or more I/O devices 120 include a network interface 122, a power control device 130, and any of a number of the other I/O devices 120. I/O devices 120 may be configured to receive input from a user or other computer systems and/or to provide output to a user or other computer systems. An I/O device 120 may interface with the processor circuit 110 directly, or through an I/O interface (not shown). An I/O interface may be any of various types of interfaces configured to couple to and communicate with other devices, according to various embodiments. In one embodiment, the I/O interface is a bridge chip (e.g., Southbridge) from a front-side to one or more back-side buses. The I/O interfaces may be coupled to one or more I/O devices 120 via one or more corresponding buses or other interfaces. Various I/O devices 120 are discussed in further detail herein in connection with FIG. 3.

Network interface 122 may be any of a number of devices that computer system 100 may use to connect to other computer systems on a network. In some embodiments, network interface 122 may be wired (e.g., an Ethernet port) or wireless (e.g., an IEEE 802.11 wireless receiver, a cellular receiver), or a combination. In some embodiments, the one or more I/O devices 120 includes multiple network interfaces 122 (e.g., an Ethernet port, an IEEE 802.11 wireless receiver, and a cellular receiver). In various embodiments, network interface 122 is connected to a local area network, the Internet, or both. Network interface 122 receives communications from the network (e.g., sent by a remote computer system) and relays them to processor circuit 110 and sends communications to the network (e.g., to a remote computer system) as requested by processor circuit 110.

Network interface 122 is configured to receive communications 150. Such communications 150 may come from a remote computer system (not shown) and may include information indicating a task to be performed by computer system 100 in a power-down state as discussed herein. Computer system 100 may be configured to authenticate the remote computer system (not shown) while computer system 100 is in a power-up state, and then determine whether a communication 150 received while computer system 100 is in the power-down state was received from the authenticated remote computer system. For example, such authentication may include receiving cryptographic information (e.g., a public key) from the remote computer system. The authentication may, for example, be tied to a user account and password of a user of computer system 100. The authentication may also be tied to a biometric identifier of the user (e.g., thumbprint, retina scan, voice scan, etc.). When a communication 150 is received in the power-down state, computer system 100 may determine whether the communication 150 was received from the authenticated remote computer system (not shown) using, for example, the received cryptographic information. In some embodiments, network interface 122 may establish a communication link with the remote computer system (not shown) during the power-up state and maintain the communication link during a power-down state. In some embodiments, network interface 122 may receive communications 150 from any number of remote computer systems, but when in the power-down state only respond to certain communications 150 (e.g., communications 150 received from an authenticated remote computer system, communications 150 received form a remote computer system with which network interface 122 has maintained a communication link). In some embodiments, computer system 100 may only respond to communications 150 containing certain information during the power-down state (e.g., a certain sequence of bits at the beginning of the communication 150).

Power control device 130 is a physical control that, in response to a user-initiated action, is configured to control the supply of power to computer system 100. Accordingly, power control device 130 may be, for example, a power button, power switch, power toggle control, etc. Changing the state of power control device 130 (e.g., by pressing a power button) may thus be said to be a user-initiated action, or, alternately a user-initiated power request (e.g., a power-up request, a power-down request). Power control device 130 is configured to cause electrical power to be connected to or disconnected from computer system 100. In various embodiments, power control device 130 may control or affect the operation of a power supply circuit within computer system 100.

In some embodiments, in operation power control device 130 may receive a user manipulation (e.g., press of a power control button) and in response send a power request (e.g., power-up request, a power-down request) to the computer system 100 (e.g., to a power supply controller of the computer system [not shown]) to cause electrical power to be connected or disconnected to computer system 100. In such embodiments, a user activation of power control device 130 (e.g., button on the keyboard) may cause an electrical signal to be sent to computer system 100 causing computer system 100 to begin to transition into a power-up state (or to transition into a power-down state). In some of such embodiments, power control device 130 may be a button on a keyboard of the computer system 100. In others of such embodiments and where computer system 100 is a mobile phone or tablet computer, power control device 130 may be a power button disposed on one or more of a front surface of computer system 100, a back surface of computer system 100, a side surface of computer system 100.

In other embodiments, power control device 130 includes components which in operation physically complete a circuit allowing power to flow from a power supply to computer system 100 or physically disconnect a circuit thereby preventing power from flowing from a power supply to computer system 100. Power control device 130 may be configured to cause computer system 100 to transition from a power-down state to a power-up state (e.g., by sending a power-up request to computer system 100) or to cause computer system 100 to transition from a power-up state to a power-down state (e.g., by sending a power down request to the computer system 100). As discussed herein, however, computer system 100 may receive a power-up request or power-down request from other components (e.g., network interface 122, others of the plurality of I/O devices).

Memory 140 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory 140 may provide persistent storage for various programs and data as discussed herein. Memory in computer system 100 is not limited to primary storage such as memory 140. Rather, computer system 100 may also include other forms of storage such as cache memory in processor circuit 110 and secondary storage on I/O Devices 120 (e.g., a hard drive, storage array, etc.). In some embodiments, these other forms of storage may also store program instructions executable by processor circuit 110. Memory 140 is discussed in further detail herein with respect to FIG. 2.

In operation, computer system 100 may enter various power states. All, some, or none of the components of computer system 100 may receive electrical power during a particular power state. As used herein, a "power-up state" refers to a power state in which relatively more components of computer system 100 are receiving electrical power than would be in a "power-down state." Conversely, as used herein, a "power-down state" refers to a power state in which relatively fewer components of computer system 100 are receiving electrical power than would be in a "power-up state." In the power-down state, at least a portion of processor circuit 110 and network interface 122 receives electrical power. In some embodiments, a computer system 100 in a power-down state appears "turned-off" to users and in a power-up state appears "turned-on" to users. In various embodiments, a computer system 100 in a power-up state is responsive to user input received via a larger number of I/O devices 120 than a computer system 100 in a power-down state. The number of I/O devices 120 responsive to user input in a power-up state and a power-down state may vary depending upon the type of computer system 100 (e.g., laptop computer, tablet computer, mobile phone, etc.). Various types of I/O devices 120 other than network interface 122 and power control device 130 are discussed herein with reference to FIG. 3.

In some embodiments in which computer system 100 is a desktop computer or laptop computer, I/O devices 120 include the network interface 122, power control device 130, a keyboard, a pointing device, and one or more displays. In a power-up state, such a desktop computer or laptop computer may display a graphical user interface on the one or more displays and is responsive to user commands (e.g., button presses) received via the keyboard and pointing device in addition to input received via network interface 122 and power control device 130. In a power-down state, such a desktop computer or laptop computer may not display a graphical user interface on the one or more displays and may not be responsive to user commands received via the keyboard and pointing device. In a power-down state, however, such a desktop computer or laptop computer may be responsive to input received via network interface 122 (e.g., communication 150) and input received via power control device 130 (e.g., a power-up request). In some embodiments, a desktop computer or laptop computer may also include a microphone, image capture device, and/or peripheral device port (e.g., headphone jack, USB port, Lightning port). While such a microphone, image capture device, or peripheral device port may be accessed to perform a task in a power-down state as discussed herein, such a microphone, image capture device, or peripheral device port might not otherwise be responsive to user commands during a power down state but would generally be responsive to user commands during a power-up state. In some embodiments, a desktop computer or laptop computer may also include one or more speakers. While such speakers may be accessed to perform a task in a power-down state as discussed herein, such speakers may not otherwise play sounds during a power-down state.

In some embodiments in which computer system 100 is a tablet computer, mobile phone, or wearable computer, I/O devices 120 include the network interface 122, power control device 130, a touch-display, and one or more physical controls (e.g., buttons, switches, etc. distinct from the power control device 130). In a power-up state, such a tablet computer, mobile phone, or wearable computer may display a graphical user interface on the touch-display and be responsive to user commands (e.g., button presses, display gestures) received via the touch-display and/or one or more physical controls in addition to input received via network interface 122 and power control device 130. In a power-down state, however, such a tablet computer, mobile phone, or wearable computer may not display a graphical user interface on the touch-display or be responsive to user commands received via the touch-display or one or more buttons. In a power-down state, however, such a tablet computer, mobile phone, or wearable computer may be responsive to input received via network interface 122 (e.g., communication 150) and input received via power control device 130 (e.g., a power-up request). In some embodiments, a tablet computer, mobile phone, or wearable computer may also include a microphone, image capture device, and/or peripheral device port (e.g., headphone jack, USB port, Lightning port). While such a microphone, image capture device, and/or peripheral device port may be accessed to perform a task in a power-down state as discussed herein, such a microphone, image capture device, and/or peripheral device port might not otherwise be responsive to user commands during a power down state, they may be responsive to user commands during a power-up state. In some embodiments, a tablet computer, mobile phone, or wearable computer may also include one or more lights or speakers. While such lights or speakers may be accessed to perform a task in a power-down state as discussed herein, such lights will not otherwise be illuminated and such speakers will not otherwise play sounds during a power-down state but may be illuminated or play sounds during a power-up state.

Thus, in some embodiments, a computer system 100 comprises a processor circuit 110 and a plurality of I/O devices 120 including a network interface 122 and a power control device 130. In such embodiments, the computer system 100 is configured, in response to receiving a user-initiated power-down request via a particular one of the plurality of I/O devices 120, to enter a power-down state in which user communication with the computer system 100 is disabled via the plurality of I/O devices 120 except via the network interface 122 and power control device 130 until a power-up request is subsequently received by the computer system 100. In these embodiments, the computer system 100 is further configured to, in the power-down state, maintain power to the processor circuit 110 such that, in response to a communication received via the network interface 122, the processor circuit 110 is configured to perform a task specified by the communication without exiting the power-down state. In such embodiments, the computer system is configured further still to, in response to receiving a power-up request, exit the power-down state and enter a power-up state in which the computer system 100 is responsive to user commands via ones of the I/O devices 120 other than the network interface 122 and the power control device 130.

In some embodiments, computer system 100 comprises a processor circuit 110 and a plurality of I/O devices 120 including a network interface 122, a power control device 130, one or more displays, a keyboard, and a pointing device. In such embodiments, the computer system 100 is configured, in response to receiving a user-initiated power-down request via a particular one of the plurality of I/O devices 120, to enter a power-down state in which the one or more displays does not display a user interface and user communication with the computer system 100 is disabled via the keyboard and pointing device until a power-up request is subsequently received. In these embodiments, the computer system 100 is further configured to, in the power-down state, maintain power to the processor circuit 110 such that, in response to a communication received via the network interface 122, the processor circuit 110 is configured to perform a task specified by the communication without exiting the power-down state. In such embodiments, the computer system is configured further still to, in response to receiving a power-up request, exit the power-down state and enter a power-up state in which a user interface is displayed on the one or more displays and the computer system 100 is responsive to user commands via the keyboard and pointing device.

In some embodiments, computer system 100 comprises a processor circuit 110 and a plurality of I/O devices 120 including a network interface 122, a power control device 130, a touch-display, and one or more other physical controls. In such embodiments, the computer system 100 is configured, in response to receiving a user-initiated power-down request via a particular one of the plurality of I/O devices 120, to enter a power-down state in which the touch-display does not display a user interface and user communication with the computer system 100 is disabled via the touch-display and one or more other physical controls until a power-up request is subsequently received. In these embodiments, the computer system 100 is further configured to, in the power-down state, maintain power to the processor circuit 110 such that, in response to a communication received via the network interface 122, the processor circuit 110 is configured to perform a task specified by the communication without exiting the power-down state. In such embodiments, the computer system is configured further still to, in response to receiving a power-up request, exit the power-down state and enter a power-up state in which a user interface is displayed on the touch-display and the computer system 100 is responsive to user commands via the touch-display and one or more buttons.

In embodiments in which computer system 100 runs an operating system (e.g., a primary operating system for computer system 100 such as Apple iOS® or Microsoft Windows®), the operating system is booted up and running in the power-up state. In some embodiments, transitioning to the power-up system includes booting this primary operating system, while transitioning to power-down state including running outside the auspices of the primary operating system (e.g., by disabling or stopping its execution). As discussed herein, certain components of the computer system receive power in the power-down state as long as power is available (e.g., an integrated battery has available power). In some of such embodiments, a second processor circuit (e.g., a second processor circuit 202 discussed below in connection to FIG. 2) may, in operation, also execute a secondary operation system to implement the various tasks performed in a power-down state as discussed herein.

In operation, computer system 100 is configured, in response to receiving a user-initiated power-down request via a particular one of the plurality of I/O devices, to enter a power-down state in which user communication with computer system 100 is disabled via the plurality of I/O devices 120 except via the network interface 122 or power control device 130 until a user-initiated power-up request is subsequently received via power control device 130. In some embodiments, computer system 100 is configured, in the power-down state, to maintain power to processor circuit 110 such that, in response to a communication 150 received via network interface 122, processor circuit 110 is configured to perform a task specified by the communication 150 without exiting the power-down state. Examples of such tasks are discussed herein in connection to FIGS. 5-10.

In some embodiments, computer system 100, in response to receiving a power-up request via power control device 130, is configured to exit the power-down state and enter a power-up state in which computer system 100 is responsive to user commands via ones of the I/O devices 120 other than network interface 122 and power control device 130. In some embodiments, computer system 100, in response to receiving power-up request via the power control device 130, is configured to exit the power-down state, boot-up an operating system of computer system 100, and enter the power-up state in which computer system 100 is responsive to user commands via ones of the I/O devices 120 other than network interface 122 or power control device 130. In some embodiments, computer system 100, in the power-up state, is configured to one or more of: respond to user commands via one or more of a keyboard, pointing device, or touch-display; or cause a user interface to be displayed to a user. In such embodiments, the I/O devices 120 include the keyboard, pointing device, touch-display, and display on which the user interface is displayed.

Computer system 100 disclosed herein may, therefore, be used to accomplish any of a number of tasks in the power-down state. In some embodiments, to a user, computer system 100 appears to be completely "turned off" (e.g., no user interface is being displayed on any monitors coupled to computer system 100, computer system 100 does not respond to user input such as button presses on an I/O device 120 such as a keyboard), but computer system 100 in fact has the capability to perform various tasks as requested in communications 150. Such communications 150 may be received with network interface 122 during the power-down state so long as network interface 122 is able to receive such communications 150 (e.g., network interface 122 is in range of a wireless communication access point such as a cell tower or Wi-Fi transmitter). As will be described below, the ability to perform certain tasks in a power-down state may confer various advantages such as increased data security (e.g., by remotely backing up or deleting data on a lost computer system 100, disabling a computer system 100 with sensitive information), the ability to locate a misplaced or stolen computer system 100 (e.g., by determining the geographic location of a computer system 100), increased convenience (e.g., by downloading data from a remote computer system, checking memory 140, accessing an I/O device).

Additionally, the ability to perform various tasks in a power-down state is an improvement over previous techniques such as wake-on LAN. In previous wake-on LAN techniques, a wake-on LAN computer system could be transitioned to a power-up state remotely via a wake-on LAN communication (e.g., a communication with a certain sequence of information or "magic packet"). To receive such wake-on LAN communications, a wake-on LAN computer system provides power to its network interface during power-down states. Upon receiving the wake-on LAN communication, the network interface causes the wake-on LAN computer system to transition to a power-up state. That is, with wake-on LAN a computer system could be remotely turned on, but the wake-on LAN computer system could not perform tasks in the power-down state without transitioning to a power-up state.

Figure 2:
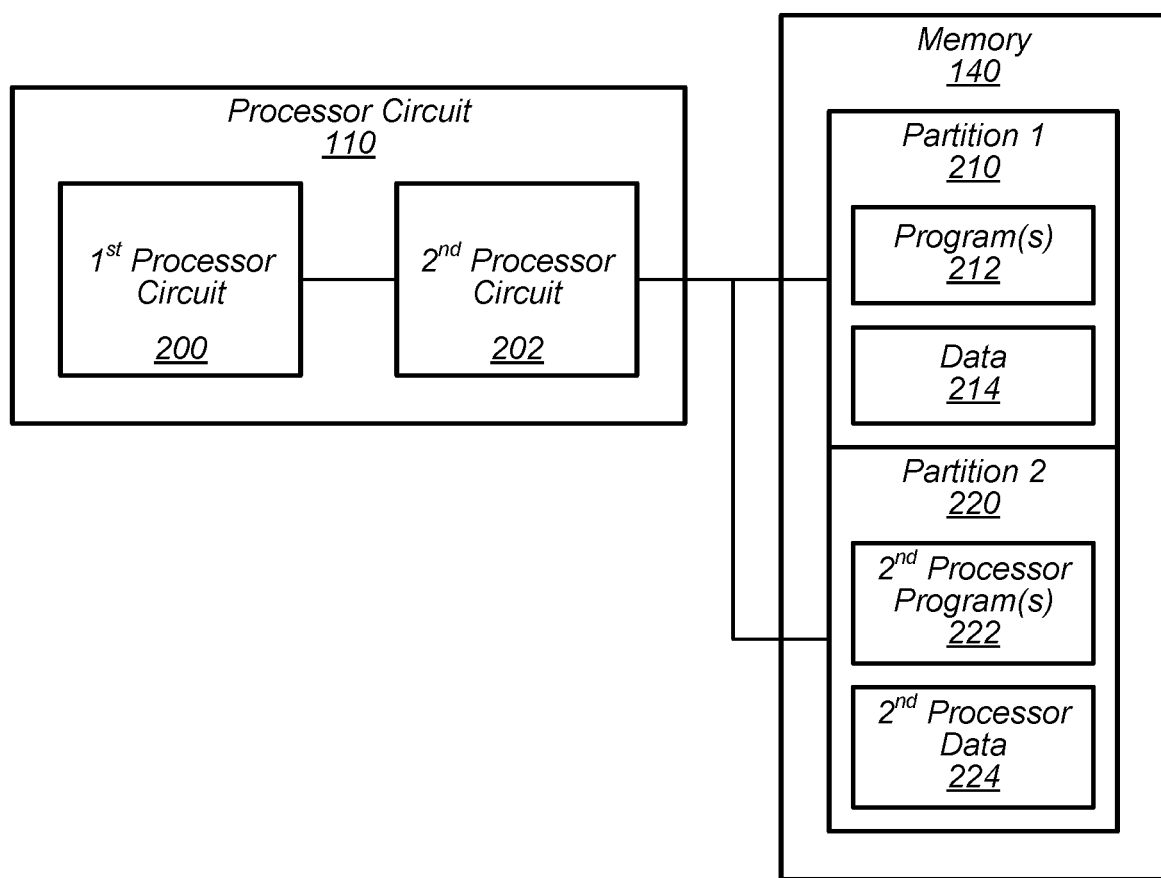
FIG. 2 is a block diagram showing further detail of the processor circuit and memory of the computer system of FIG. 1 in accordance with various embodiments.

Referring now to FIG. 2, a block diagram showing further detail of processor circuit 110 and memory 140 of a computer system 100 in accordance with various embodiments is depicted. In the embodiments depicted in FIG. 2, processor circuit 110 includes a first processor circuit 200 and a second processor circuit 202 and memory 140 includes a first partition 210 and a second partition 220.

In some embodiments, first processor circuit 200 comprises a first integrated circuit and second processor circuit 202 comprises a second integrated circuit. In some embodiments, first processor circuit 200 includes firmware to control the operation of first processor circuit 200. In some embodiments, second processor circuit 202 includes firmware to control the operation of second processor circuit 202. The first processor circuit 200 and second processor circuit 202 have separate connections to the one or more power supplies of the computer system 100 such that in operation of the computer system 100 the second processor circuit 202 receives power during a power-up state and a power-down state and the first processor circuit 202 receives power during the power-up state but not the power-down state. In some embodiments, first processor circuit 200 and the second processor circuit 202 may each have their own dedicated network interface 122. In such embodiments, network interface 122 dedicated to the second processor circuit 202 receives the communications 150 including instructions to perform one or more tasks in a power-down state as discussed herein.

The first partition 210 of memory 140 is configured to store at least one or more programs 212 and data 214. The second partition 220 is configured to store at least one or more second processor programs 222 and second processor data 224. In some embodiments, first partition 210 is accessible by the first processor circuit 200 and the second processor circuit 202, but second partition 220 is accessible by the second processor circuit 202 but not first processor circuit 200. The one or more programs 212 may be any of a number of programs implemented by the computer system 100 to perform the various tasks performed by the computer system 100. In some embodiments, one of the programs 212 is an operating system of the computer system 100. The data 214 may be any data stored by the computer system 100, and may include data used by computer system 100 as part of the execution of the one or more programs 212.

In some embodiments, all of memory 140 may be encrypted. In other embodiments, some of the memory 140 may be encrypted (e.g., first partition 210 is encrypted but second partition 220 is unencrypted, first partition 210 is unencrypted but second partition 220 is encrypted, various portions of first partition 210 and second partition 220 are encrypted but other portions of either or both are not). In embodiments where some or all of memory 140 is encrypted, cryptographic operations used to encrypt information before storage in memory 140 or to decrypt encrypted portions of memory 140 during a memory access may be performed with second processor circuit 202 as discussed herein.

The one or more second processor programs 222 include instructions that when executed by second processor circuit 202 cause second processor circuit 202 to perform the operations associated with the tasks performed in a power-down state as discussed herein. For example, such operations include the operations discussed herein with reference to FIGS. 5-10. In some embodiments, a second processor program 222 is a second processor circuit operating system that aids in the execution of the various tasks in a power-down state and/or performs the memory management functions discussed herein. Second processor data 224 may be any data that is used by second processor circuit 202 as part of the execution of the one or more second processor programs 222. In some embodiments, second processor data 224 includes cryptographic information used to authenticate a remote computer system as discussed herein or other authentication information (e.g., a user name and password associated with a user of the computer system 100).

In some embodiments, the one or more second processor programs 222 may be executed independently of the operating system of the computer system 100 (e.g., a program 210). In this way, the second processor circuit 202 may be configured to perform a task (e.g., one indicated in communication 150) in a power-down state independent of the operating system of the computer system 100. As used herein, the phrase "independently of the operating system" means that the program 222 may be executed by the second processor circuit 202 regardless of the information stored in the first partition 210 and without any assistance from the operating system stored in first partition 210. In some embodiments, the program 222 may be executed even if, for example, the operating system of the computer system 100 has been corrupted, damaged, or uninstalled and a hostile operating system has been installed.

In some embodiments, second processor circuit 202 is configured to perform cryptographic operations for the computer system 100. In some of such embodiment, some or all of memory 140 is encrypted, and the cryptographic operations include encrypting data to be stored in memory 140 and decrypting encrypted data during a memory access. In some embodiments, the cryptographic operations include authenticating a remote computer system that has sent a request to computer system 100 or decrypting an encrypted request sent by a remote computer system. In some embodiments, the cryptographic operations include authenticating requests from a user to transition to a power-up state (e.g., by authenticating a use name, password, personal identification number, biometric information). Performing a cryptographic operation may include accessing second processor data 224 that includes cryptographic information (e.g., a stored security key used to authenticate a remote computer system as discussed herein) or other authentication information (e.g., a user name and password associated with a user of the computer system 100).

In some embodiments, first processor circuit 200 is configured to access memory 140 through second processor circuit 202. In at least some of such embodiments, the second processor circuit 202 is configured to control memory 140 for both first processor circuit 200 and second processor circuit 202. In such embodiments, this arrangement prevents first processor 200 from accessing second partition 220 of memory 140. In such embodiments, a malicious program being executed by first processor circuit 200 cannot alter the functions of the second processor circuit 202 as it executes the one or more second processor programs 222, including the second processor programs 222 that execute the various tasks in a power-down state discussed herein (e.g., FIGS. 5-10). In such embodiments, this allows the tasks performed in a power-down state to be executed independently of the operating system of the computer system 100. In some embodiments, the first processor circuit 200 initiates a request for operating system data (e.g., data 214) stored in the memory 140. In such embodiments, the second processor circuit 202 accesses the operating system data (e.g., data 214) stored in the memory 140 in response to such a request. In such embodiments, the second processor circuit 202 sends the accessed data to the first processor circuit 200.

In operation, computer system 100 is configured, in response to receiving a user-initiated power-down request, to enter a power-down state in which power is removed from a first portion of the computer system 100 that includes first processor circuit 100, but in which power is still supplied to a second portion of computer system 100 that includes second processor circuit 202 and network interface 122. Further, the computer system 100 is configured, in the power-down state, to perform, by second processor circuit 202 and without exiting the power-down state, a task specified by a communication 150 received via network interface 122. Further still, computer system 100 is configured such that second processor circuit 202 and network interface 122 are not able to be turned off via a request initiated by the user.

In some embodiments, computer system 100 is configured such that the second processor circuit 202 and network interface 122 are not able to be turned off via a user-initiated software request for computer system 100 to enter the power-down state or a user manipulation of a power control device 130 (e.g., a power button). For example, a user may decide that he or she is done using computer system 100 for the moment and enter a shutdown command (e.g., with a keyboard or pointing device) to the operating system of computer system 100. In such embodiments, the shutdown command causes the computer to transition from a power-up state to a power down state and appear "turned off" to the user, but is still responsive to commands 150 received via network interface 122 as discussed herein. Such a shutdown command will not cause second processor circuit 202 and network interface 122 to lose power. As discussed herein, memory 140 may also receive power during the power-down state if the task to be performed in the power-down state involves accessing memory 140. In some embodiments, the user may only be able to remove power to second processor circuit 202 and network interface 122 by physically disconnecting the power supply of the computer system 100 (e.g., by removing a battery, unplugging the computer system from a wall outlet, etc.). Thus, in various embodiments of computer system 100, there is no software command or hardware control that permits the user to power down certain portions of computer system 100.

In some embodiments, the task to be performed in the power-down state may be a remote power-up request. In such an embodiment, the task includes initiating a transition from the power-down state to a power-up state in which power is applied to the first portion of computer system 100 and the second portion of computer system 100. In some of such embodiments, a user may initiate the transition by causing the command 150 to be sent to the network interface 122 (e.g., by accessing a remote computer system and requesting that the remote computer system send such a command 150).

Figure 3:
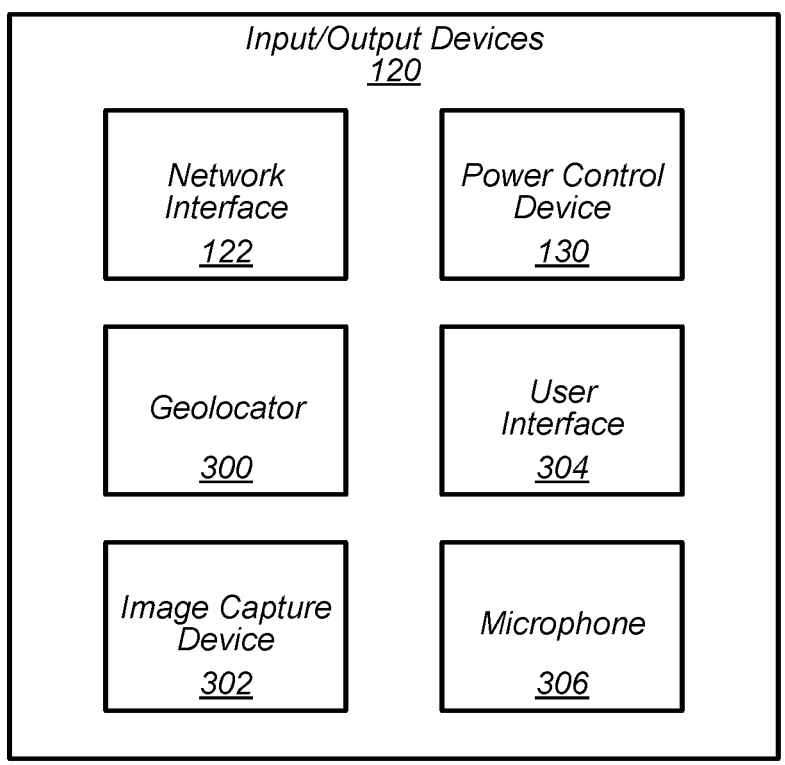
FIG. 3 is a block diagram showing further detail of the input/output devices of the computer system of FIG. 1 in accordance with various embodiments.

Referring now to FIG. 3, a block diagram is depicted showing further detail of the I/O devices 120 of a computer system 100 in accordance with various embodiments. In various embodiments, computer system 100 includes a network interface 122, power control device 130, geolocator 300, image capture device 302, user interface 304, and microphone 306. While only one of each kind of I/O device 120 is shown in FIG. 3, in various embodiments computer system 100 may include more than one of some or all of the I/O devices 120 shown in FIG. 3 (e.g., more than one image capture device 302). In some embodiments, computer system 100 does not include all of the I/O devices 120 depicted in FIG. 3 (e.g., computer system 100 does not include a microphone 306). The various I/O devices 120 depicted in FIG. 3 are merely illustrative and do not limit the scope of the kind of I/O device 120 that may be coupled to a computer system 100. Accordingly, a computer system 100 may include I/O devices 120 that are not shown in FIG. 3 such as peripheral device ports (e.g., headphone jack, USB port, Lightning port), heat sensors, radiation sensors, actuators, relays, motors, lasers, storage devices (e.g. hard drive, optical drive, removable flash drive, storage array, SAN, or their associated controller), etc. In some embodiments, the I/O devices 120 may be coupled to an input/output interface which interfaces the I/O devices 120 with the processor circuit 110. In some embodiments, some or all of the I/O devices 120 interface directly with the processor circuit 110.

Geolocator 300 may be any of a number of devices configured to determine a geographic location of computer system 100. For example, geolocator 300 may be a GPS receiver or similar receiver for determining a geographic location based on signals received from a constellation of satellites. In some embodiments, the geolocator 300 may be configured to determine a geographic location (e.g., latitudinal and longitudinal coordinates) based on signals from terrestrial sources such as cellular phone towers. Additionally, Wi-Fi networks can also be used in some embodiments for geolocation by having a service available over the Internet that knows where a given network is located.

Image capture device 302 may be any of a number of devices configured to collect visual information such as cameras, photosensors, digital imaging sensors, etc. Image capture device 302 may record still photographs, video, or both. As discussed herein, computer system 100 may include more than one image capture device 302. For example, in some embodiments where computer system 100 is a mobile phone or tablet computer, computer system 100 may include an image capture device 302 on the same side of computer system 100 as a display screen and a second image capture device 302 on the side of computer system 100 opposite the display screen. Microphone 306 is an audio recording device configured to receive audio information and convert it to electrical signals for processing by processor circuit 110 and/or storage in memory 140. Microphone 306 may be used to record audio and/or interface with the user (e.g., through the use of voice recognition).

User interface 304 may include any of a number of devices to interface with a user of computer system 100 either by receiving information from the user, presenting information to the user, or both. For example, in some embodiments, user interface 304 is a touch-display configured to present visual information to the user and receive information from the user via touches on the display. In some embodiments, computer system 100 includes multiple user interfaces 304 including a keyboard and pointing device (e.g., mouse, trackball, trackpad, etc.) configured to receive information from the user via button presses, trackball movement, optical mouse laser sensor, etc. In some embodiments, user interface 304 includes a display coupled to computer system 100 directly or indirectly (e.g., coupled to the computer system 100 via network interface 122). In some embodiments, a user interface 304 may comprise one or more speakers to present audio information. Additionally or alternatively, a user interface 304 may comprise one or more haptic devices to present tactile information (e.g., by vibrating). Additionally or alternatively, a user interface 304 may comprise one or more lights (e.g., one or more LEDs) to present visual information. In operation, such embodiments may allow a communication 150 to be sent to computer system 100 to play a sound, vibrate, and or flash lights during a power-down state (e.g., to help a user locate a misplaced or stolen computer system 100).

Figure 4:
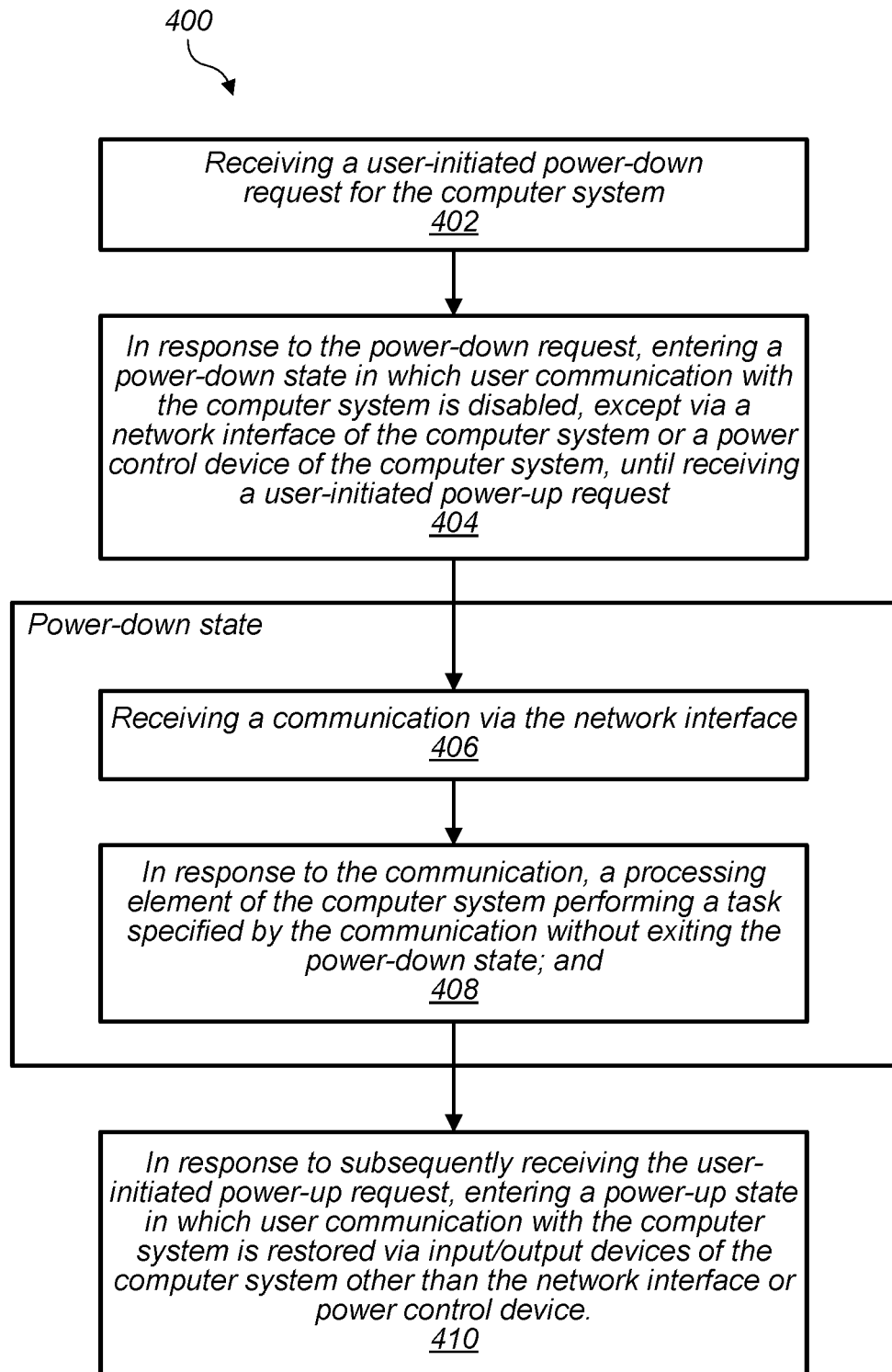
FIG. 4 is a flowchart representing a method for performing a task with a computer system in a power-down state in accordance with the disclosed embodiments.

Referring now to FIG. 4, a flowchart is shown illustrating a method 400 for performing a task with a computer system in a power-down state. Method 400 is implemented with computer system 100. At block 402, computer system 100 receives a user-initiated power-down request for computer system 100. At block 404, in response to the power-down request, computer system 100 enters a power-down state in which user communication with computer system 100 is disabled, except via a network interface 122 of computer system 100 or a power control device 130 of the computer system 100, until receiving a user-initiated power-up request. At block 406, while computer system 100 is in the power-down state: computer system 100 receives a communication 150 via network interface 122. At block 408, while computer system 100 is in the power-down state: in response to the communication 150, a processing element (e.g., processor circuit 110) of computer system 100 perform a task specified by the communication 150 without exiting the power-down state. At block 410, in response to subsequently receiving the user-initiated power-up request, computer system 100 enters a power-up state in which user communication with computer system 100 is restored via I/O devices 120 of computer system 100 other than the network interface 122 or power control device 130.

In some embodiments, method 400 may include additional operations. For example, in some embodiments, prior to receiving the user-initiated power-down request, computer system 100 (e.g., with network interface 122) establishes a communication link with a remote computer system. In such embodiments, while computer system 100 is in the power-down state: the computer system maintains the communication link with the remote computer system; and receives the communication from the remote computer system via the maintained communication link.

Figure 5:
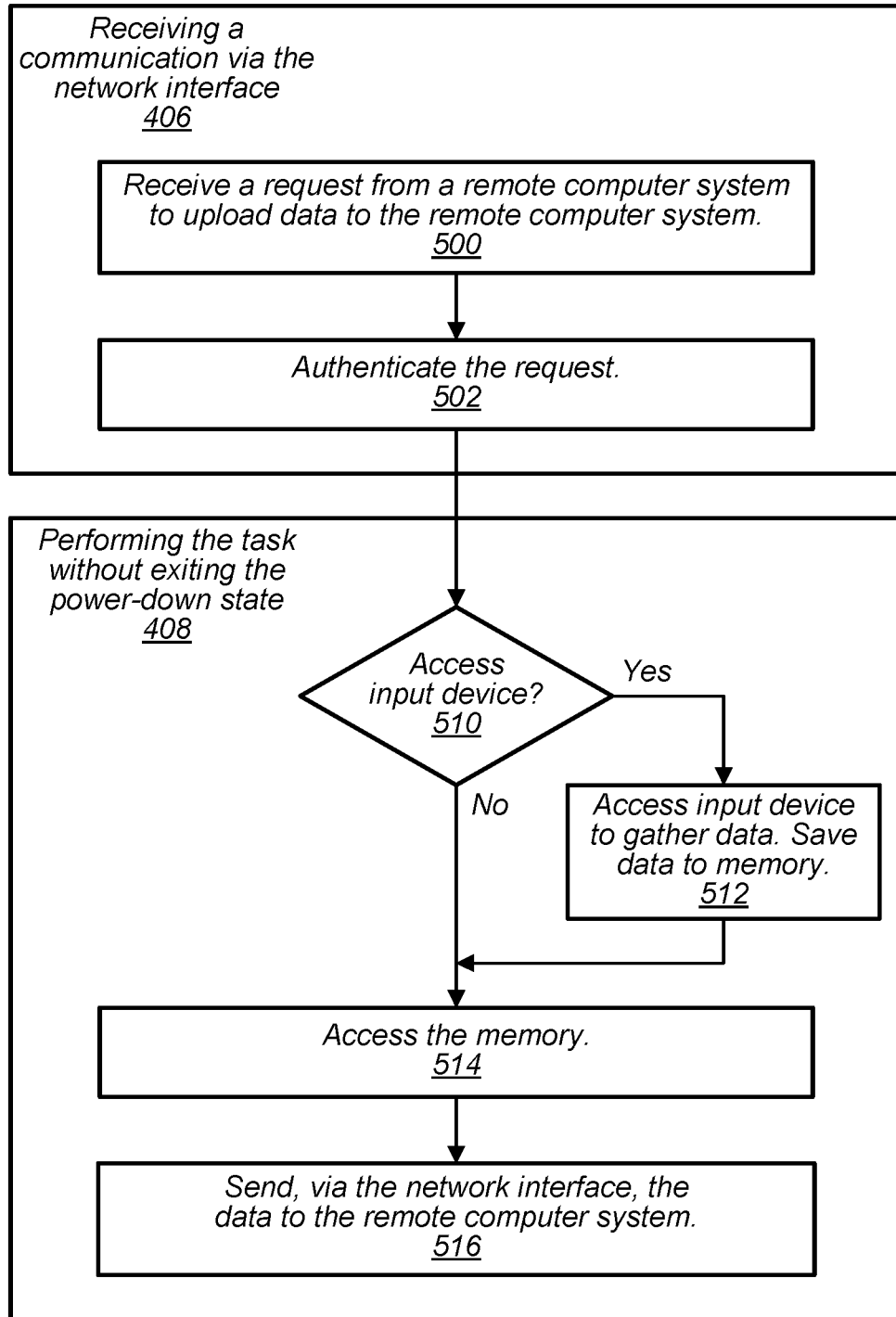
FIGS. 5-10 are flowcharts showing further detail of some of the operations performed in a power-down state in the method of FIG. 4 in accordance with various embodiments.
Figure 6:
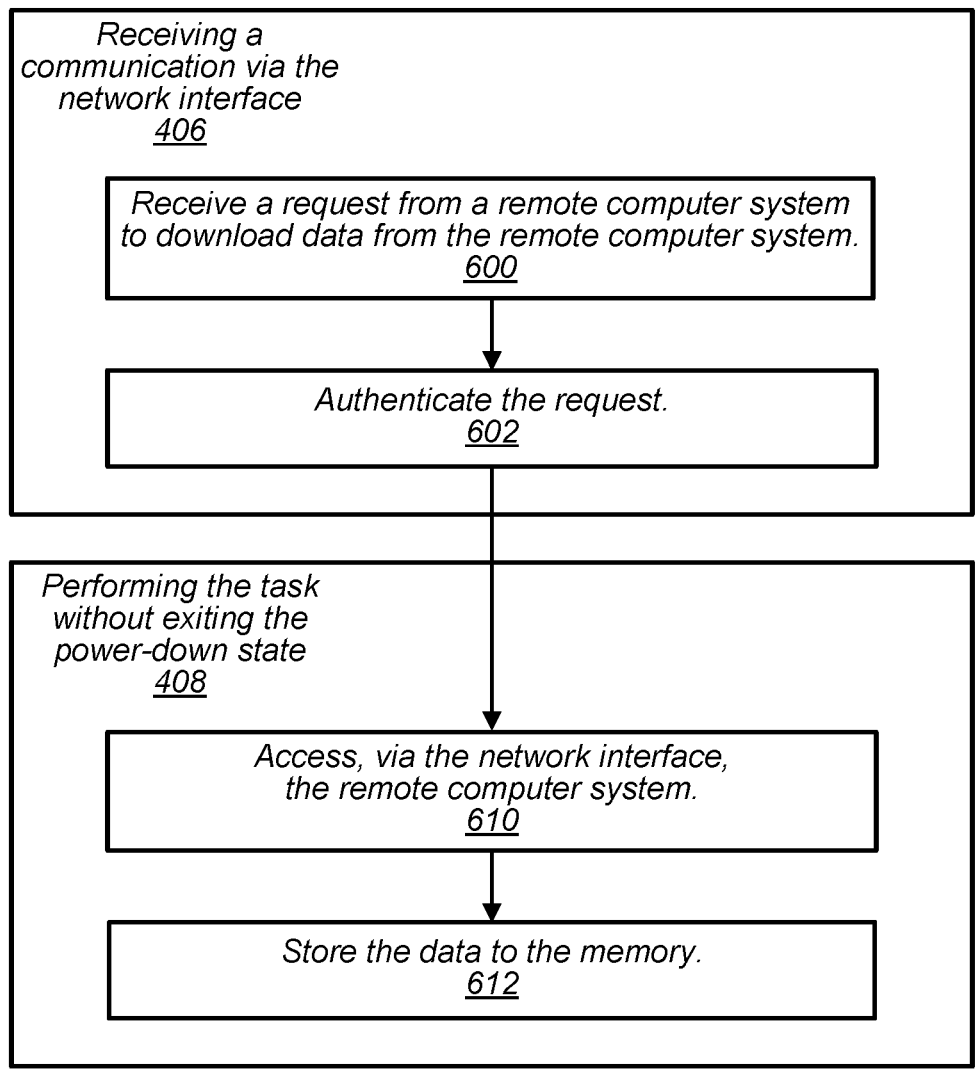
Figure 7:
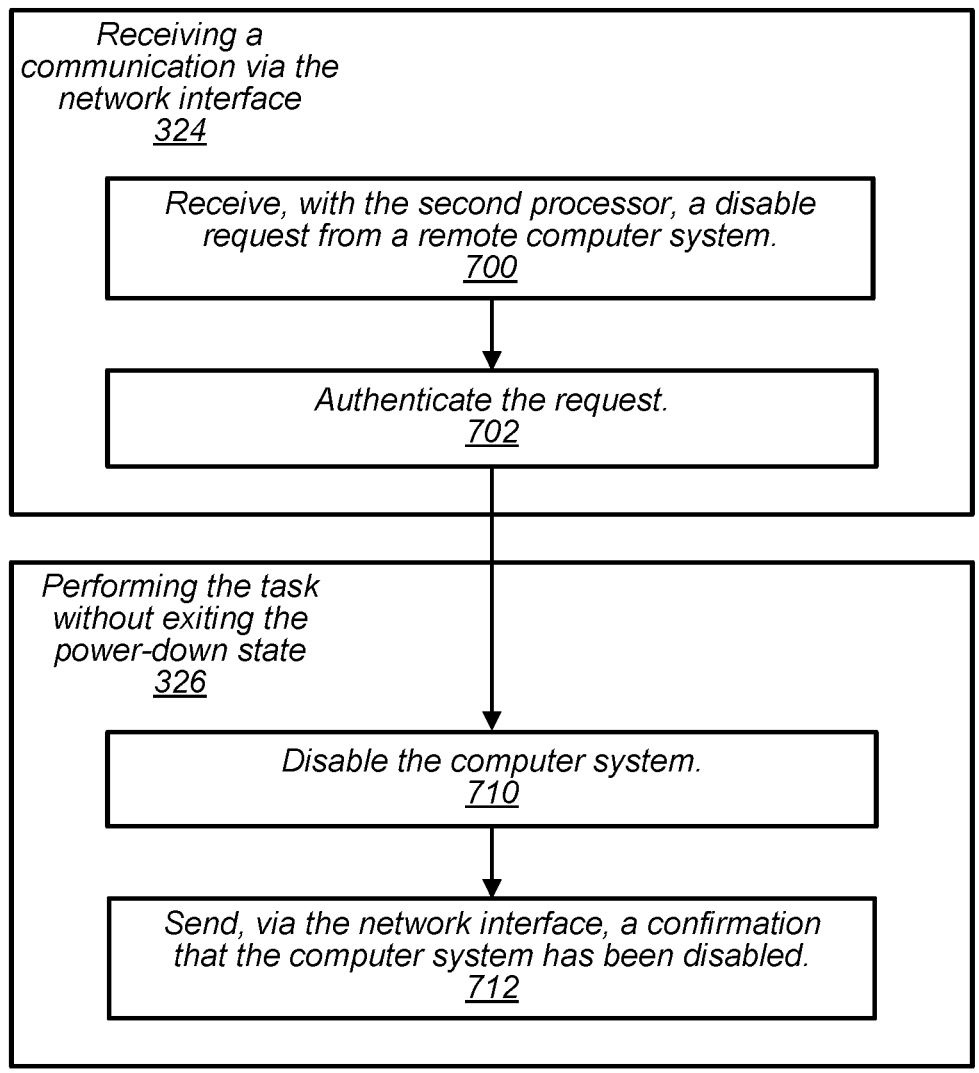
Figure 8:
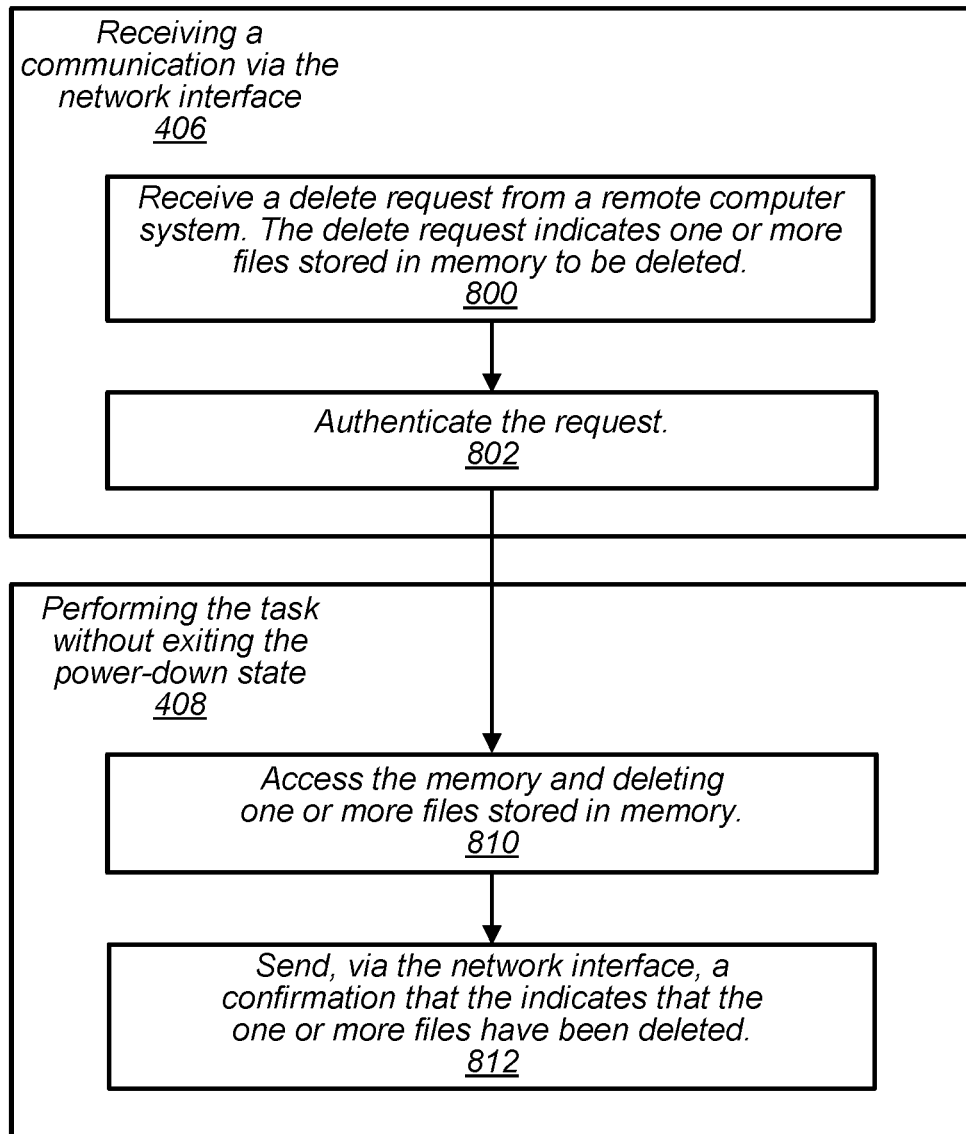
Figure 9:
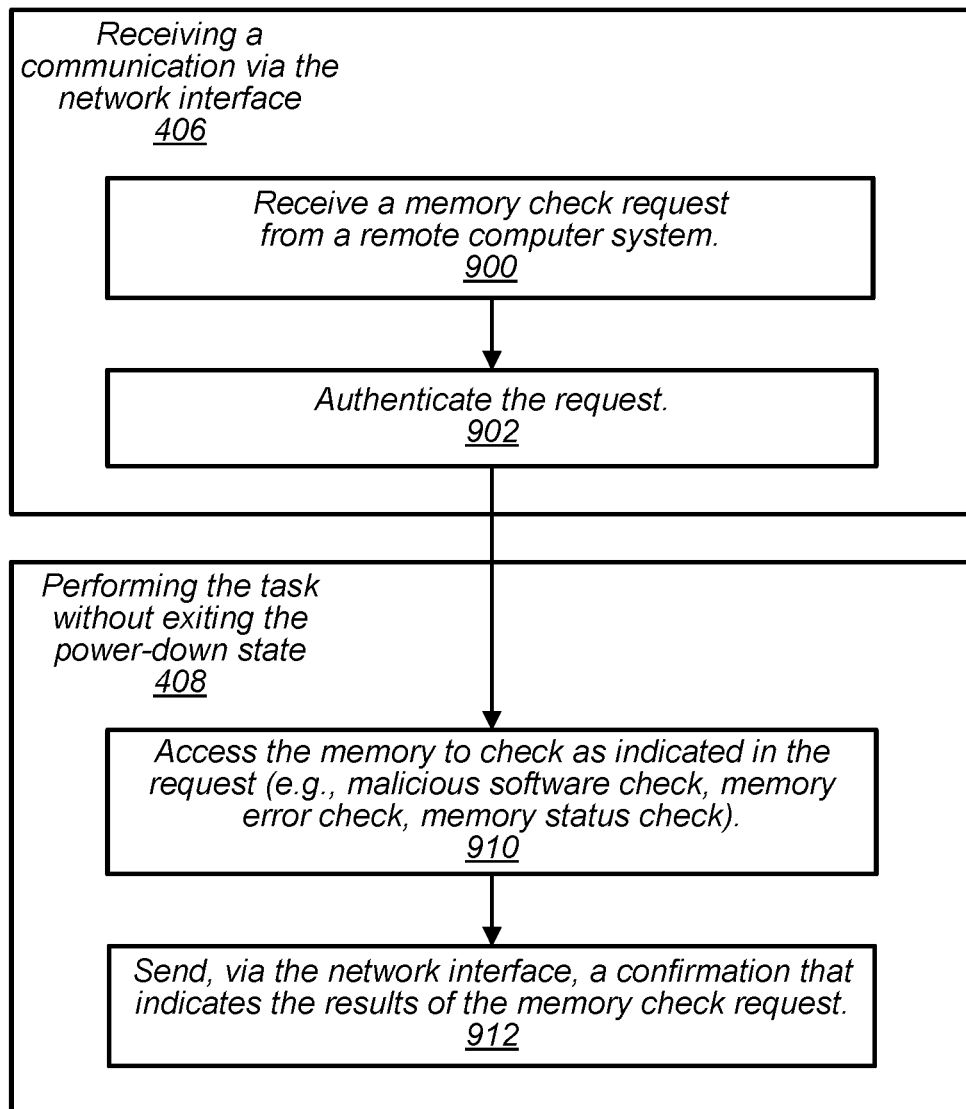
Figure 10:
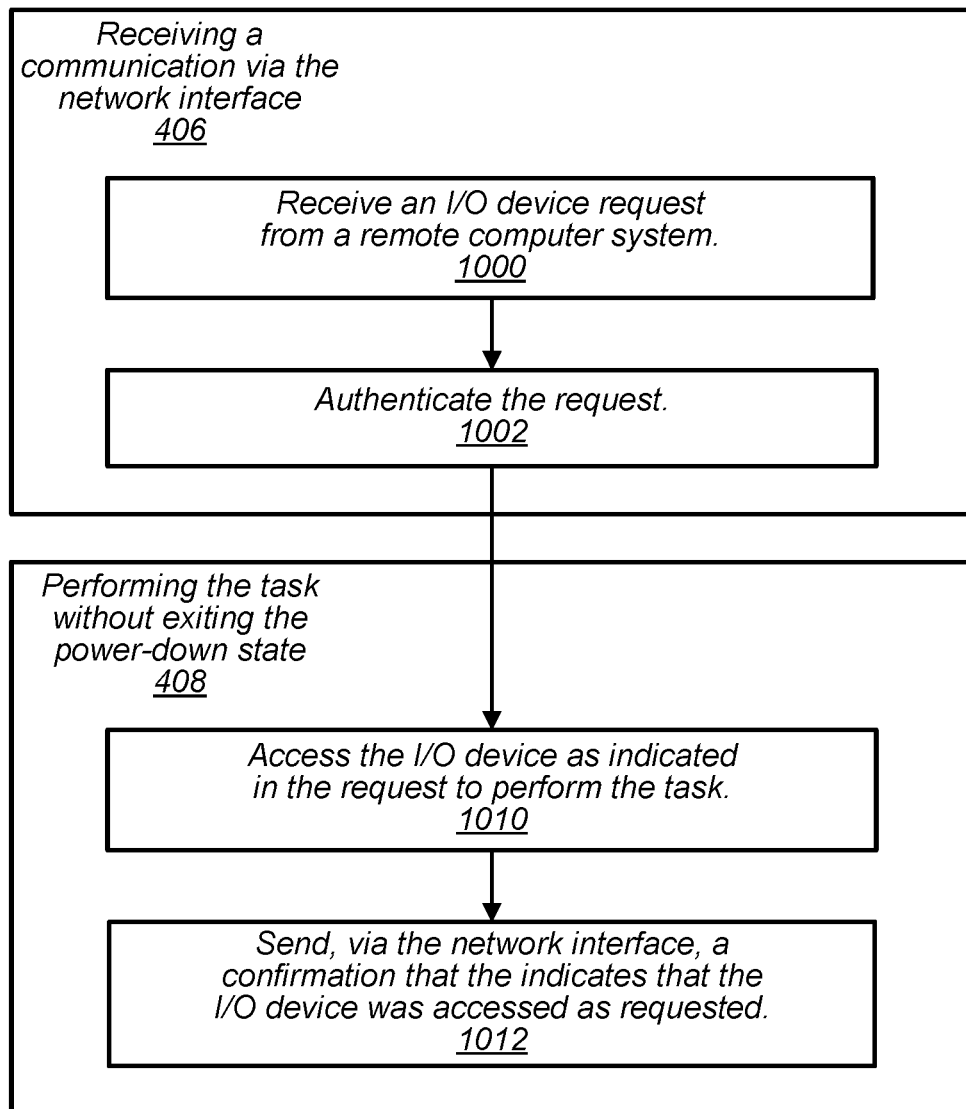

With general reference to FIGS. 5-10, blocks 406 and 408 of method 400 may include any of a number of various operations related to the communication 150 received from a remote computer system and the task to be performed by computer system 100 during the power-down state. FIG. 5 relates to embodiments where the task relates to uploading data from computer system 100 to a remote computer system. FIG. 6 relates to embodiments where the task relates to downloading data from a remote computer system and storing the data on computer system 100. FIG. 7 relates to embodiments where the task relates to disabling computer system 100. FIG. 8 relates to embodiments where the task relates to deleting one or more files stored in memory 140 of computer system 100. FIG. 9 relates to embodiments where the task relates to performing a check on memory 140 of the computer system 100. FIG. 10 relates to accessing an I/O device 120 of computer system 100. The examples discussed in relation to FIGS. 5-10 are not limiting, however, and computer system 100 may execute tasks in a power-down state other than those discussed in connection to FIGS. 5-10.

Referring again to FIG. 5, a flowchart is depicted showing further detail about blocks 406 and blocks 408 of FIG. 4 in accordance with some embodiments. At block 500, computer system 100 receives a request from a remote computer system to upload data to the remote computer system. In some embodiments, the request included in communication 150 is for data that is currently stored (or believed by the remote computer system to be currently stored) at computer system 100. For example, in such embodiments the data to be uploaded may be one or more files relating to contact information stored at computer system 100. In other embodiments, the request included in communication 150 is for data that computer system 100 must collect (e.g., with an I/O device 120) before uploading. The communication 150 may indicate where the requested is to be uploaded (e.g., to a particular remote computer system), or the data may be uploaded to the remote computer system from which the communication 150 was received.

At block 502, computer system 100 authenticates the request. In some embodiments where one or more remote computer systems have been authenticated previously when computer system 100 was in a power-up state as discussed herein, authenticating the request includes determining whether communication 150 was received from one of the authenticated remote computer systems. In such embodiments, the request may be authenticated if the communication 150 including the request was received from an authenticated remote computer system. Additionally or alternatively, authenticating the request may include analyzing the communication 150 including the request to determine whether the communication 150 includes authenticating markers such as a code signifying that the communication 150 is for a request to be performed in a power-down state or cryptographic information. Additionally or alternatively, authenticating the request may include computer system 100 interrogating the remote computer system indicated as requesting the task to determine whether the remote computer system in fact sent the request or whether a third-party computer system is spoofing the address of the remote computer system.

At block 510, computer system 100 determines whether performing the request to upload data requires accessing an input device to gather data. This determination may be based on one or more indicators included in communication 150. Such indicators may specify what kind of data is to be uploaded, whether the remote computer system believes that computer system 100 already has the data stored in memory 140, and/or whether an I/O device 120 should be accessed. If computer system 100 determines to access an I/O device 120, method 400 proceeds to block 512. If not, method 400 proceeds to block 514.

At block 512, computer system 100 accesses one or more I/O devices 120 to gather data and stores the gathered data in memory 140. Accessing the one or more I/O device 120 includes computer system 100 providing power to the accessed I/O devices 120 and memory 140 as is useful to accomplish the requested task in the power-down state. As discussed herein with reference to FIG. 3, the I/O devices 120 may be any of a number of devices including network interface 122, power control device 130, geolocator 300, image capture device 302, user interface 304, microphone 306, or other devices which may receive input or present output. In some embodiments, the task includes determining a geographic location of computer system 100 (e.g., by accessing a geolocator 300) and storing said geographic location in memory 140. In some embodiments where computer system 100 includes an image capture device 302, the task includes using image capture device 302 to capture one or more images (e.g., still images, video) and storing said images in memory 140. In addition to capturing images, that computer system 100 may capture additional contextual information for the images such as the geographic location where the images were captured (e.g., with a geolocator 300) or sound (e.g., with a microphone 306). In some embodiments where computer system 100 includes a microphone 306, the task includes using the microphone 306 to capture sounds and store said sound in memory 140.

At block 514, computer system 100 accesses memory 140. Accessing memory 140 includes providing power to memory 140 as is useful to accomplish the requested task in the power-down state. Accessing memory 140 includes identifying the data to be sent to the remote computer system and preparing it for upload. In some embodiments, some or all of the memory 140 is encrypted, and in such embodiments accessing the memory 140 includes the second processor circuit 202 performing one or more cryptographic operations (e.g., decrypting the stored data to be sent to the remote computer system). At block 516, computer system 100 sends, via network interface 122, the requested data (e.g., one or more files in the memory 140) to the remote computer system. In embodiments where the requested data is one or more images captured with image capture device 302, the sending includes sending the one or more images to a remote computer system via the network interface 122. In embodiments where the requested data is the geographic location of the computer system 100, the sending includes sending the geographic location to the remote computer system via network interface 122.

The operations disclosed herein with reference to FIG. 5 may enable computer system 100 to perform any of a number of useful tasks related to locating a misplaced or stolen computer system 100 or related to remotely backing up data that is stored on computer system 100 to a remote computer system. In the former case, even if a malefactor inputs a command to transition computer system 100 to a power-down state (e.g., by "turning off" computer system 100 using a keyboard of computer system 100), the owner of computer system 100 may be able to determine its geographic location to aid retrieval or identify the malefactor (e.g., using captured images, using recorded sound). In the latter case, the owner of computer system 100 may be able to retrieve valuable data stored on computer system 100 even if the computer system 100 cannot be located or retrieved as long as the computer system 100.

Referring again to FIG. 6, a flowchart is depicted showing further detail about blocks 406 and blocks 408 of FIG. 4 in accordance with some embodiments. At block 600, computer system 100 receives a request from a remote computer system to download data from the remote computer system. For example, the request may indicate that certain files stored on the remote computer system (e.g., one or more images, one or more text files, one or more entries for a calendar, etc.) that computer system 100 is to download and store in memory 140 while in a power-down state. The communication 150 may indicate where the requested is to be downloaded from (e.g., to a particular remote computer system), or the data may be from the remote computer system from which the communication 150 was received.

At block 602, computer system 100 authenticates the request. In some embodiments where one or more remote computer systems have been authenticated previously when computer system 100 was in a power-up state as discussed herein, authenticating the request includes determining whether communication 150 was received from one of the authenticated remote computer systems. In such embodiments, the request may be authenticated if the communication 150 including the request was received from an authenticated remote computer system. Additionally or alternatively, authenticating the request may include analyzing the communication 150 including the request to determine whether the communication 150 includes authenticating markers such as a code signifying that the communication 150 is for a request to be performed in a power-down state or cryptographic information. Additionally or alternatively, authenticating the request may include computer system 100 interrogating the remote computer system indicated as requesting the task to determine whether the remote computer system in fact sent the request or whether a third-party computer system is spoofing the address of the remote computer system.

At block 610, computer system 100 accesses, via network interface 122, the remote computer system and downloads data from the remote computer system. At block 612, computer system 100 stores the downloaded data in memory 140. In some embodiments, some or all of the memory 140 is encrypted, and in such embodiments accessing the memory 140 includes the second processor circuit 202 performing one or more cryptographic operations (e.g., encrypting the downloaded data before storing it in memory 140).

The operations disclosed herein in with respect to FIG. 6 may enable computer system 100 to perform any of a number of useful tasks related to ensuring that the data stored on computer system 100 is up-to-date. A user may use multiple computer systems 100 (e.g., a smartphone, a tablet computer, and a laptop computer). If the user, for example, has set up a shared directory to be propagated across multiple computer systems 100, the operations discussed in relation to FIG. 6 may allow the user to ensure that information in the shared directory has been propagated to all of the relevant computer system 100, even if such computer systems 100 are in power-down states. In some embodiments, the operations discussed with respect to FIG. 6 may enable computer system 100 to download updates at a convenient time when computer system 100 is not being used by the user and is in a power-down state. In such embodiments, if a remote computer system has an update to a program installed on computer system 100 (e.g., a program 212), the remote computer system may request that computer system 100 download the update in the power-down state for subsequent installation (e.g., when computer system 100 is in a power-up state).

Referring again to FIG. 7, a flowchart is depicted showing further detail about blocks 406 and blocks 408 of FIG. 4 in accordance with some embodiments. At block 700, computer system 100 receives a disable request from a remote computer system. In embodiments where computer system 100 can be disabled a plurality of ways as discussed herein, the disable request indicates how the computer system 100 should disable itself.

At block 702, computer system 100 authenticates the request. In some embodiments where one or more remote computer systems have been authenticated previously when computer system 100 was in a power-up state as discussed herein, authenticating the request includes determining whether communication 150 was received from one of the authenticated remote computer systems. In such embodiments, the request may be authenticated if the communication 150 including the request was received from an authenticated remote computer system. Additionally or alternatively, authenticating the request may include analyzing the communication 150 including the request to determine whether the communication 150 includes authenticating markers such as a code signifying that the communication 150 is for a request to be performed in a power-down state or cryptographic information. Additionally or alternatively, authenticating the request may include computer system 100 interrogating the remote computer system indicated as requesting the task to determine whether the remote computer system in fact sent the request or whether a third-party computer system is spoofing the address of the remote computer system.

At block 710, computer system 100 disables itself. The disabling may be a partial disabling (i.e., some components of computer system 100 are still functioning) or a complete disabling (e.g., the processor circuit 110, I/O devices 120, and memory 140 are all disabled). The disabling may be reversible (e.g., computer system 100 may be reenabled after receiving a subsequent message, having parts replaced, etc.) or irreversible (e.g., the processor circuit 110 and memory 140 are damaged such that they cannot be repaired). The disabling may be accomplished in any of a number of ways. In some embodiments where processor circuit 110 includes a first processor circuit 200 and a second processor circuit 202 and second processor circuit 202 controls memory 140, disabling computer system 100 may include second processor circuit 202 preventing first processor circuit 200 from accessing memory 140. In some embodiments, disabling computer system 100 may include physically damaging or destroying one or more components such as fuses such that computer system 100 may be partially or completely inoperable until such components are repaired or replaced. In other embodiments, disabling the computer system 100 includes locking memory 140 from accesses by any portion of the processor circuit 110 without certain cryptographic information. Such cryptographic information may be generated by the processing circuit 110 in any of a number of ways (e.g., a random number generator) and the cryptographic information may be sent to the remote computer system without computer system 100 maintaining a copy.

At block 712, computer system 100 sends, via network interface 122, a confirmation that the computer system 100 has been disabled. The confirmation may include information (e.g., cryptographic information) needed to reenable computer system 100 (e.g., to undo the disabling performed at block 710). In some embodiments, however, such a confirmation may not be sent if computer system 100 has been completely disabled as discussed herein.

The operations disclosed herein with reference to FIG. 7 may enable computer system 100 to perform any of a number of useful tasks related to ensuring data security and hardware security. For example, if a computer system 100 has been misplaced or lost, the data stored in memory 140 may be protected by disabling access to memory 140 or entire computer system 100. In other examples, if one or more components of computer system 100 is an experimental prototype or includes hardware with national security classification (e.g., Top Secret classification), such components may be destroyed after receiving a communication 150 from a remote computer system even if computer system 100 has been placed in a power-down state.

Referring again to FIG. 8, a flowchart is depicted showing further detail about blocks 406 and blocks 408 of FIG. 4 in accordance with some embodiments. At block 800, computer system 100 receives a delete request from a remote computer system. The delete request indicates one or more files stored in memory 140 to be deleted.

At block 802, computer system 100 authenticates the request. In some embodiments where one or more remote computer systems have been authenticated previously when computer system 100 was in a power-up state as discussed herein, authenticating the request includes determining whether communication 150 was received from one of the authenticated remote computer systems. In such embodiments, the request may be authenticated if the communication 150 including the request was received from an authenticated remote computer system. Additionally or alternatively, authenticating the request may include analyzing the communication 150 including the request to determine whether the communication 150 includes authenticating markers such as a code signifying that the communication 150 is for a request to be performed in a power-down state or cryptographic information. Additionally or alternatively, authenticating the request may include computer system 100 interrogating the remote computer system indicated as requesting the task to determine whether the remote computer system in fact sent the request or whether a third-party computer system is spoofing the address of the remote computer system.

At block 810, computer system 100 accesses memory 140 and deletes one or more files stored in memory 140. Accessing memory 140 includes providing power to memory 140 as is useful to accomplish the requested task in the power-down state. Accessing memory 140 includes identifying the one or more files to be deleted and erasing the one or more files from memory 140. Deleting the one or more files may include completely erasing the one or more files from memory 140. In embodiments where memory 140 includes a first partition 210 and a second partition 220 and a first processor circuit 200 has access to the first partition 210 but not the second partition 220, deleting may include deleting the one or more files from the first partition 210 with copies retained on the second partition 220. In such embodiments, the files deleted from first partition 210 may be restored from the copies on second partition 220 later (e.g., after receiving a restore message from a remote computer system). In some embodiments, the copies stored on second partition 220 may be encrypted and will need to be decrypted before being copied back over to first partition 210.

At block 812, computer system 100 sends, via network interface 122, a confirmation that the one or more files have been deleted. The confirmation may include information (e.g., cryptographic information, memory location information) needed to restore the deleted information. For example, if the confirmation included cryptographic information The operations disclosed herein with reference to FIG. 8 may enable computer system 100 to perform any of a number of useful tasks related to ensuring data security. For example, if a computer system 100 has been misplaced or lost, the data stored in memory 140 may be protected by deleting it from the computer system 100.

Referring again to FIG. 9, a flowchart is depicted showing further detail about blocks 406 and blocks 408 of FIG. 4 in accordance with some embodiments. At block 900, computer system 100 receives a memory check request from a remote computer system. The memory check request may indicate a specific type of memory check to be performed (e.g., a malicious code check) or a general memory check. In some embodiments, the memory check request includes information about a particular kind of malicious code (e.g., a new computer virus) and a request to check memory 140 of the computer system for that particular malicious code.

At block 902, computer system 100 authenticates the request. In some embodiments where one or more remote computer systems have been authenticated previously when computer system 100 was in a power-up state as discussed herein, authenticating the request includes determining whether communication 150 was received from one of the authenticated remote computer systems. In such embodiments, the request may be authenticated if the communication 150 including the request was received from an authenticated remote computer system. Additionally or alternatively, authenticating the request may include analyzing the communication 150 including the request to determine whether the communication 150 includes authenticating markers such as a code signifying that the communication 150 is for a request to be performed in a power-down state or cryptographic information. Additionally or alternatively, authenticating the request may include computer system 100 interrogating the remote computer system indicated as requesting the task to determine whether the remote computer system in fact sent the request or whether a third-party computer system is spoofing the address of the remote computer system.

At block 910, computer system 100 access memory 140 to check as indicated in the request. The memory check may include checking for one or more of malicious code or software, memory errors, or a memory status of memory 140. Checking for malicious code or software includes determining whether one or more known instances of malicious software is stored in memory 140 or left evidence that such malicious software had been previously been stored. Upon detecting malicious software, checking for malicious code or software may also include quarantining the malicious software, deleting it, and/or flagging it for further attention (e.g., when computer system 100 has entered a power-up state). Checking for memory errors includes determining whether portions of memory 140 show signs of problems relating to memory. For example, portions of memory 140 may have been corrupted as a result of an improper transition from a power-up state (e.g., due to a software crash, due to a power outage). Additionally, portions of memory 140 may show signs that said portions of memory 140 are inoperable due to damage. Checking memory status includes determining information about memory 140 and may include determining a capacity of memory 140, the amount of data stored in memory 140, the type of data (e.g., application data, media data, etc.) stored in memory 140, etc.

At block 912, computer system 100 sends, via network interface 122, a confirmation that indicate the results of the memory check request. The confirmation may include whether malicious software was detected, whether any action was taken to address malicious software that was found, whether memory errors were detected, the status of memory 140, what actions if any were taken to address malicious software or memory errors, and whether further attention is needed.

The operations disclosed herein with reference to FIG. 9 may enable computer system 100 to perform any of a number of useful tasks related to data security and data reliability. For example, if computer system 100 has been affected by malicious code, it may be preferable to address the malicious code in a power-down state rather than a power-up state.

Referring again to FIG. 10, a flowchart is depicted showing further detail about blocks 406 and blocks 408 of FIG. 4 in accordance with some embodiments. At block 1000, computer system 100 receives an I/O device request from a remote computer system.

At block 1002, computer system 100 authenticates the request. In some embodiments where one or more remote computer systems have been authenticated previously when computer system 100 was in a power-up state as discussed herein, authenticating the request includes determining whether communication 150 was received from one of the authenticated remote computer systems. In such embodiments, the request may be authenticated if the communication 150 including the request was received from an authenticated remote computer system. Additionally or alternatively, authenticating the request may include analyzing the communication 150 including the request to determine whether the communication 150 includes authenticating markers such as a code signifying that the communication 150 is for a request to be performed in a power-down state or cryptographic information. Additionally or alternatively, authenticating the request may include computer system 100 interrogating the remote computer system indicated as requesting the task to determine whether the remote computer system in fact sent the request or whether a third-party computer system is spoofing the address of the remote computer system.

At block 1010, computer system 100 accesses the one or more I/O devices 120 indicated in the request to perform the task (e.g., have a I/O device 120 do a certain action). The I/O device request may indicate a specific I/O device 120 and what action such I/O device 120 is requested to take. For example, the I/O device request may indicate one or more user interfaces 304 and the action such user interfaces 304 should take (e.g., turning a light on, playing a sound, vibrating) during the power-down state. In some embodiments, the I/O device request may indicate a relay that should be turned on or off, a motor that should be turned on or off, an actuator that should be triggered, etc. Such relays, motors, actuators, etc. may be used by computer system 100 control machinery or equipment, for example.

At block 1012, computer system 100 sends, via network interface 122, a confirmation that indicates that the one or more I/O devices 120 was accessed as requested. The confirmation may include indicators of which I/O devices 120 were accessed and what actions were performed. The confirmation may also include indicators showing that one or more I/O devices 120 failed to perform the requested action.

The operations disclosed herein with reference to FIG. 10 may enable computer system 100 to perform any of a number of useful tasks related to locating a lost device or performing a critical task in a power-down state. For example, a user may request that a remote computer system send a message to a misplaced computer system 100 and request that the misplaced computer system 100 perform actions that may make it easier to locate (e.g., by flashing a light, making a sound, vibrating, a combination). Additionally, if computer system 100 is used to control machinery or equipment, and computer system 100 has entered a power-down state, the remote computer system may be able to instruct computer system 100 to perform certain operations with said machinery or equipment even while the computer system is still in the power-down state.

While FIGS. 5-10 depict various operations performed by computer system 100 in a power-down state, some operations depicted therein may be omitted and others may be added. For example, a request to perform a task may not be authenticated upon receipt as in blocks 502, 602, 702, 809, 902, and 1002. In such embodiments, authentication may not be necessary, for example, because computer system 100 communicates with remote computer systems on a secure network. Additionally, computer system 100 may send additional communications to the remote computer system to, for example, make reports relating to the progress of performing the task while it is being performed and/or after the task is completed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer system, comprising:
a memory storing instructions that when executed cause the computer system to implement an operating system of the computer system;
a processor circuit including a first portion and a second portion, wherein the first portion is configured to access the memory via the second portion; and
a plurality of input/output (I/O) devices including a network interface and a power control device; and
wherein the computer system is configured, in response to receiving a user-initiated power-down request via a particular one of the plurality of I/O devices, to enter a power-down state in which user communication with the computer system is disabled via the plurality of I/O devices except via the network interface and power control device until a user-initiated power-up request is subsequently received via the power control device;
wherein the computer system, in the power-down state, is configured to disable the first portion of the processor circuit and maintain power to the second portion of the processor circuit such that, in response to a communication received via the network interface, the second portion of the processor circuit is configured to perform a task specified by the communication without exiting the power-down state; and wherein the computer system, in response to receiving a power-up request via the power control device, is configured to exit the power-down state and enter a power-up state in which the computer system is responsive to user commands via ones of the I/O devices other than the network interface and the power control device.

2. The computer system of claim 1, wherein the second portion of the processor circuit is configured to authenticate the communication received via the network interface.

3. The computer system of claim 1, wherein the computer system, in response to receiving the power-up request via the power control device, is configured to exit the power-down state, boot-up the operating system of the computer system, and enter the power-up state in which the computer system is responsive to user commands via ones of the I/O devices other than the network interface.

4. The computer system of claim 1, wherein the task includes determining a geographic location of the computer system and sending the geographic location to a remote computer system via the network interface.

5. The computer system of claim 1, wherein the plurality of I/O devices includes an image capture device, and wherein the task includes using the image capture device to capture one or more images and sending the one or more images to a remote computer system via the network interface.

6. The computer system of claim 1, wherein the task includes accessing the memory and sending one or more files in the memory to a remote computer system via the network interface.

7. The computer system of claim 1, wherein the power control device comprises one or more of a power switch or power button configured to send a power-up signal to the computer system.

8. The computer system of claim 1, wherein the computer system, in the power-up state, is configured to:
respond to user commands via one or more of a keyboard, point device, or touch-display; and
cause a user interface to be displayed to a user.

9. A method, comprising:
initiating, by a first processor circuit of a computer system, a request for information used to implement an operating system of the computer system stored in a persistent memory of the computer system;
accessing, by a second processor circuit of the computer system, the information used to implement the operating system from the persistent memory in response to the request;
receiving, at the computer system, a user-initiated power-down request for the computer system;
in response to the power-down request, the computer system entering a power-down state in which user communication with the computer system is disabled, except via a network interface of the computer system or a power control device of the computer system, until receiving a user-initiated power-up request;
while the computer system is in the power-down state:
receiving a communication via the network interface;
in response to the communication, the second processor circuit of the computer system performing a task specified by the communication without exiting the power-down state; and in response to subsequently receiving the user-initiated power-up request, entering a power-up state in which user communication with the computer system is restored via input/output devices of the computer system other than the network interface or power control device.

10. The method of claim 9, further comprising:
prior to receiving the user-initiated power-down request, authenticating a remote computer system; and
wherein receiving the communication includes determining whether the communication was received from the authenticated remote computer system.

11. The method of claim 9, further comprising:
prior to receiving the user-initiated power-down request, establishing a communication link with a remote computer system; and
while the computer system is in the power-down state:
maintaining the communication link with the remote computer system; and
wherein receiving the communication includes receiving the communication from the remote computer system via the maintained communication link.

12. The method of claim 9, wherein performing the task includes downloading data from a remote computer system and storing it on a memory of the computer system.

13. The method of claim 9, wherein performing the task includes determining whether malicious software has been installed on the computer system.

14. A computer system, comprising:
a first processor circuit;
a second processor circuit;
a network interface;
wherein the computer system is configured, in response to receiving a user-initiated power-down request, to enter a power-down state in which power is removed from a first portion of the computer system that includes the first processor circuit, but in which power is still supplied to a second portion of the computer system that includes the second processor circuit and the network interface;
wherein the computer system is configured, in the power-down state, to perform, by the second processor circuit and without exiting the power-down state, a task specified by a communication received via the network interface; and
wherein the computer system is configured such that the second processor circuit and the network interface are not able to be turned off via a request initiated by a user of the computer system.

15. The computer system of claim 14, further comprising:
a memory; and
wherein the computer system is configured such that the second processor circuit is configured to control access to the memory by the first processor circuit.

16. The computer system of claim 15, wherein the task includes the second processor circuit preventing the first processor circuit from accessing the memory.

17. The computer system of claim 15, wherein the task includes accessing the memory and sending one or more files to a remote computer system via the network interface.

18. The computer system of claim 15, wherein the task includes accessing the memory and deleting one or more files stored in the memory.

19. The computer system of claim 14, wherein the task includes disabling the computer system.

20. The computer system of claim 14, wherein the computer system is configured such that the second processor circuit and the network interface are not able to be turned off by:
    a user-initiated software request for the computer system to enter the power-down state or a user manipulation of a power button.

\* \* \* \* \*